J. A. VANDER WAAG.

Velocipedes.

No. 6,250. Reissued Jan. 26, 1875.

Attest.

Wm. S. Bates
Jeremiah F. Twohig

Inventor.

J. A. van der Waag
by Fitler & Duncan
Ats Attys.

THE GRAPHIC CO. PHOTO-LITH. 39 & 41 PARK PLACE, N.Y.

UNITED STATES PATENT OFFICE.

JOHANNES A. VAN DER WAAG, OF BROOKLYN, NEW YORK, ASSIGNOR, BY MESNE ASSIGNMENTS, TO AUGUSTUS COOKE, OF CINCINNATI, OHIO.

IMPROVEMENT IN VELOCIPEDES.

Specification forming part of Letters Patent No. 88,347, dated March 30, 1869; reissue No. 6,250, dated January 26, 1875; application filed August 19, 1874.

*To all whom it may concern:*

Be it known that I, JOHANNES A. VAN DER WAAG, of Brooklyn, New York, have invented certain new and useful Improvements in Velocipedes, of which the following is a specification:

The nature of my invention consists, first, in providing the velocipede with a peculiar mechanism to propel and operate it by a rocking motion of the body of the operator, so that the operator, by moving his body and limbs in a comfortable and pleasant manner, can make use of the power of his body and limbs to propel on a road. It consists, secondly, in the arranging of the devices for transferring motion from the operator to the driving-wheel in a peculiar manner, whereby the speed of the driving-wheel may be changed with facility, and the operator can pass rough portions or elevated parts of a road with greater facility and less labor than with those now used, in which no provision is made for change of speed; and it consists, finally, in the combination and arrangement of parts of which the velocipede is constructed, whereby a simple and conveniently-propelled velocipede is obtained that can be manufactured with durability and little expense, and can be operated by many delicate and sickly persons not properly capable of walking.

To enable others skilled in the art to make and use my invention, I will proceed to describe its construction and operation.

Figure 1:
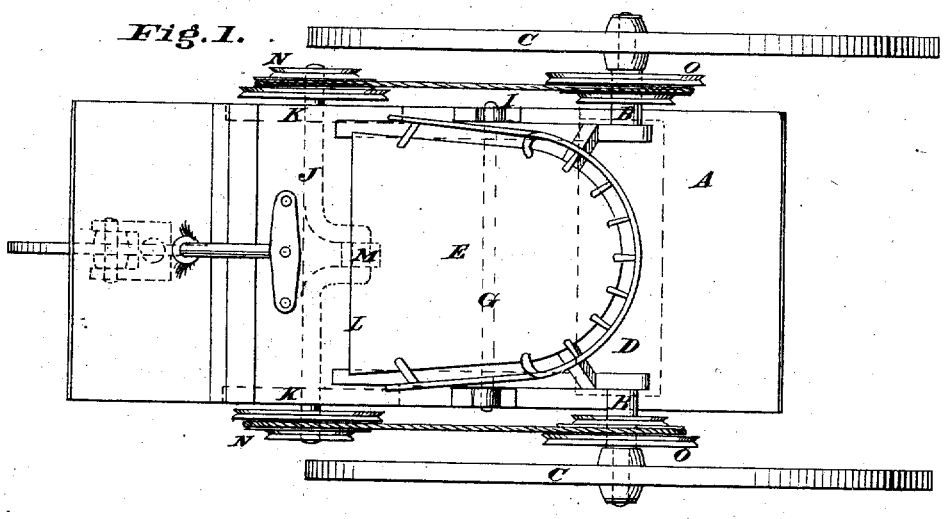
Figure 2:
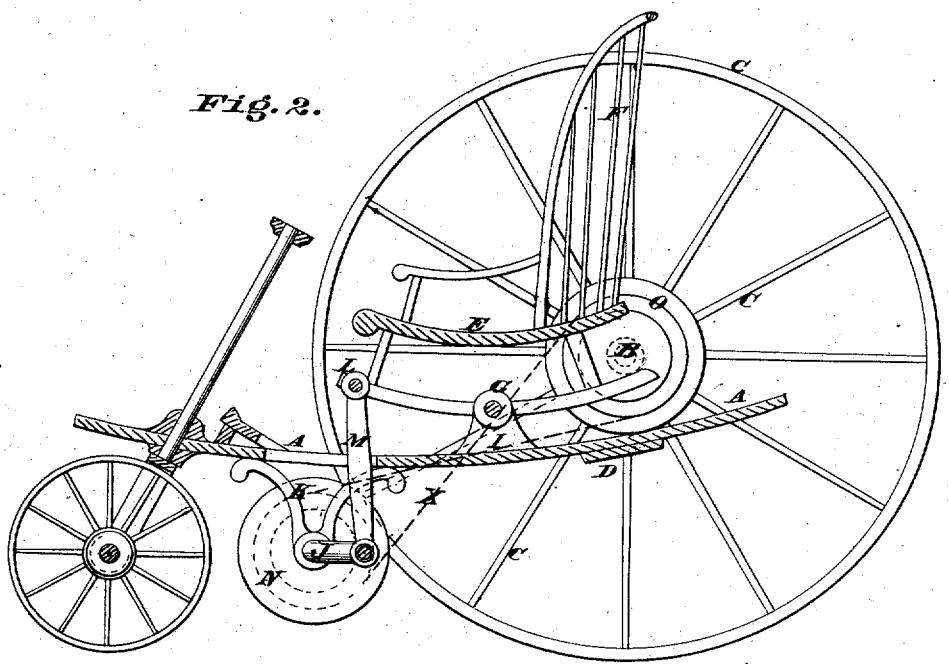

Figure 1 represents a top view of a velocipede constructed with my improvements. Fig. 2 is a longitudinal vertical section of the same.

Similar letters of reference indicate corresponding parts in the several figures.

A in the drawing represents the platform or body of the velocipede, which is supported upon the stationary axle B of the driving-wheels C C. I construct this body of a flat sheet, but longitudinally curved, as shown; and, in order to have the seat sufficiently low, I prefer to set the central part of the axle B considerably below the center of the driving-wheels, as shown, and make it with a flat part, D, under the platform, to provide for the proper securing of the platform with it. E represents the seat of the operator. It has a proper back, F, to it, and the legs of the same are provided with the usual runners, or a similar cross-piece, uniting the rear legs with the front legs of the same. Now, nearly centrally, or somewhat to rear of the chair or seat, I provide a rock-shaft, G, which passes through the runners, or is otherwise secured to them permanently; and upon the platform A I arrange two standards, I I, which are firmly secured upon the said platform, and serve as bearings for the rock-shaft to vibrate therein, so that the operator's seat is properly supported upon the said rock-shaft, and may be vibrated by the operator with facility. In order to transfer the motion of the rocking chair or seat to the driving-wheels, I employ a crank-shaft, J, revolving in bearings K K, secured on the under side of the platform, and have, on the front part of the seat, a cross-bar, L, connecting both front parts of the runners, which bar is connected with the cranks of the said crank-shaft by means of the rod M. Upon the one end of the shaft J, outside of the bearings K, I provide the same with a pulley, N, and have a corresponding pulley, O, secured on the inside of the respective driving-wheels, so that the reciprocating motion of the seat is transmitted and converted into a rotary motion to the shaft J, and from it transmitted, by the employment of a proper belt, to the driving-wheel.

Instead of using one crank upon the shaft J, it may be preferred, in the practical construction, to use two or more, and have them so connected, combined, and arranged with the rocking chair, that the same will operate simultaneously, whereby the operator may apply his power to more advantage, and pass the dead-center of the crank or cranks with facility.

Both pulleys N and O are provided with several peripheral faces, of different diameters, so that the belt may be changed and placed upon a larger or smaller pulley or face thereof upon the shaft J, and may be changed on the corresponding smaller or larger face or pulley on the driving-wheel, and thereby the speed varied accordingly between the shaft and driving-wheels.

The front part of the platform rests upon the ordinary guide or steer wheel, which is provided with the usual means for turning its course and steering the velocipede.

From the foregoing, it will be perceived that by the means herein shown, the operator can, with pleasant motion of his body, produce the required propelling-power to the velocipede, so that the operation is less fatiguing to the operator than with the modes heretofore used, and by means of the devices for changing the speed of the velocipede he is enabled to pass rough or elevated portions of the road with less labor and less fatigue than with the devices heretofore used, which are not capable of changing the speed.

Having fully described my invention, what I claim therein, and desire to secure by Letters Patent, is—

1. The combination of seat or chair E, fitted with rockers and crank J, joined by a connecting-rod to said seat, as and for the purposes described.

2. The combination of oscillating seat E, connecting-rod M, and crank J, as and for the purposes described.

3. The combination of rocking seat E, crank J, connected directly to rocking seat E by connecting-rod M, belt X, pulleys N and O, and driving-wheels C C, as and for the purposes specified.

J. A. VAN DER WAAG.

Witnesses:
J. NORRIS,
A. M. DAVENPORT.